UNITED STATES PATENT OFFICE.

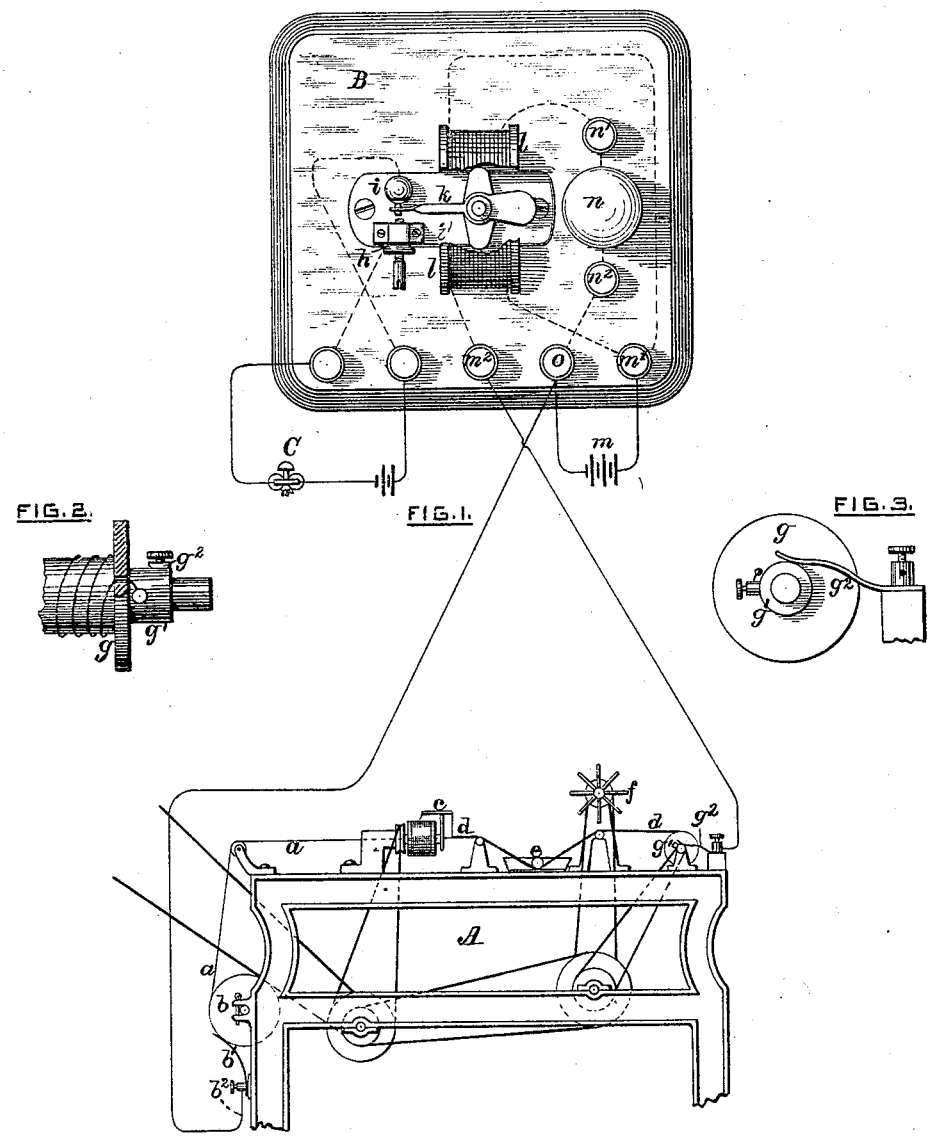

GEORGE A. MASON, OF INDIANAPOLIS, INDIANA, ASSIGNOR TO EUGENE F. PHILLIPS, OF PROVIDENCE, RHODE ISLAND.

METHOD OF AND APPARATUS FOR ELECTRICALLY MEASURING INSULATED WIRE.

SPECIFICATION forming part of Letters Patent No. 250,560, dated December 6, 1881.

Application filed June 30, 1881. (No model.)

*To all whom it may concern:*

Be it known that I, GEORGE A. MASON, of Indianapolis, in the county of Marion and State of Indiana, have invented a certain new and useful Method of Electrically Measuring Insulated Wire During the Process of Insulation, and Novel Apparatus for that Purpose; and I do hereby declare that the following specification, taken in connection with the drawings furnished and forming a part thereof, is a clear, true, and complete description of my invention.

Although variously applicable my invention has been developed by me with special reference to magnet-wire coiled upon spools for sale, or directly coiled into helices for various uses in electrical apparatus. Insulated wire used for this purpose is quite expensive, and heretofore much waste has accrued from the fact that prior to my invention the matter of bulk or lineal measurement has been wholly relied upon for building up a helix of any given electrical dimensions, or, in other words, any given resistance. Having, as heretofore, severed the insulated coiled wire from the main length or supply of insulated wire on testing helices or coils desired in uniformity, they are in practice found to so far vary as to occasion much labor and liability to imperfection if splicing is resorted to, and loss in wire if any excess has to be removed, because in this latter case it must be removed a little at a time until safely reduced to the requisite scale without liability of passing below the capacity for resistance desired. It is well known that metals intentionally of the same grade, same gage of wire, and insulated in like manner will be found to vary in resistance on a comparison of equal lengths, and it is also equally true that in some cases equal separate lengths all derived from one continuous length of magnet-wire will be found to vary, more or less, owing sometimes, no doubt, in whole or in part to variations in the density of the finely-drawn metal, and sometimes in whole or in part to slight faults in the insulation imperceptible under ordinary or usual optical inspection.

By reason of my invention, I have, so far as my knowledge extends, for the first time rendered it possible to electrically measure insulated wire during the process of insulation, so that when one or more lengths, coils, or helices of any stated resistance are desired they can be consecutively detached from the continuous length of naked wire, as soon as the insulation and coiling of each required quantity is completed.

After a full description of my novel method, and apparatus devised by me for practicing the same, the features deemed novel will be designated in the several claims hereunto annexed.

Referring to the drawings, Figure 1 is a graphic illustration of apparatus devised by me and suited for attaining the ends sought in accordance with my invention. Figs. 2 and 3 are respectively a vertical section and an end view of a portion of a winding or coiling spool and its shaft as used in my apparatus.

In the drawings, at A, I have shown so much of an insulating apparatus as is deemed essential for the full understanding of my invention. The coil of naked wire *a* is on a reel, *b*, located with relation to the winder *c*, so as to deliver the wire vertically and thence horizontally through the spindle of the winder, as usual. The wire *d*, insulated by the usual silk or cotton thread, may also, if desired, be passed through a more or less volatile shellac or other suitable solution, as at the pan or tank *e*. In some instances an insulating solution is applied without the silk or cotton, and, however such may be used, it is advisable to employ a blower or fan, *f*, for thoroughly drying the insulating matter before reaching the spool *g*, which should also in such case be sufficiently remote from the tank *e* to admit of proper time for the hardening or drying operation. If the wire is desired to be permanently wound on said spool, the fan may be dispensed with. It is to be understood that heretofore no means of which I have cognizance had been devised in connection with such apparatus, whereby the electrical measurement of the insulated wire on spool *g* could be determined until after it had been detached from the machine and cut from the coil of naked wire. For attaining the ends sought, and providing for such a predetermined adjustment of the apparatus that a coil of any stated resistance may be coiled directly from the insulating apparatus, I provide for a separate electrical connection with the naked wire *a* on reel *b*, and with the insulated wire *d* on spool *g*.

Adjacent to the reel *b*, I provide an electrical conducting spring-arm, *b'*, pivoted upon an adjacent standard, and arranged at its outer end to lie flatly upon the periphery of the coil of naked wire, and provided with a screw-post for the reception of an electric conductor, $b^2$, hereinafter further described. The spool *g* is mounted upon an insulated revolving spindle, and one end of each spool, used as a receptacle for the insulated wire, is laterally perforated for the passage of a naked initial end of said wire, which is secured to a post in a conducting-sleeve, *g'*, on the spool shaft or spindle, and adjacent to said shaft a conducting spring-arm, $g^2$, provided with a screw-post, is arranged to bear with good electric contact upon the surface of the sleeve *g'*. In some cases the spool *g* will be such as are used in electrical apparatus, made of hard rubber or other suitable material, well-known winding-machines slowly operated being then used in that connection, and in other cases cheap wooden spools will be used, on which the wire is sent to market, and from which the wire is to be rewound permanently on spools for magnets, induction-coils, &c.

As thus far described it will be seen that I have provided for an electric circuit through the insulating and coiling apparatus, and that substantially whatever resistance may be found in said circuit will occur in the insulated wire, progressively accumulated between the winder *c* and the axis or sleeve *g'* of the spool *g*, because, electrically considered, the mass of naked wire is no more than a mass of fine copper. I make this circuit available as follows:

At any convenient point observable from near the machine I locate a galvanometer, B, of any approved type, provided with front and back stops, *h* and *i*, between which the point of the needle *k* vibrates when variably influenced by its double coil or helix *l*. The stops *h* and *i* are respectively connected in circuit with a battery to a bell, C, or other suitable signaling device, preferably electrically operated. This galvanometer is used by me simply because it serves my purpose as an extremely sensitive relay, the vibrating element thereof being the needle *k*, which is actively controlled by two coils in the helix *l*, traversed by opposing or balancing electric currents.

I have stated that the signal is preferably operated electrically; but I do not limit myself thereto, because it is obvious that clockwork may be provided with a detent, controlled by the moving or vibrating element in the relay, so that signals may be given precisely as with the more convenient signal-operated directly by electricity. Both forms of signals would, however, be preferably controlled by opposing or balancing electric currents operating within the helix of the relay.

It is obvious that the use of the signaling apparatus is a matter of great convenience; but the measuring apparatus can alone be relied upon, if closely watched by an attendant, at or about the time the coil on spool *g* is seen to be nearly large enough, because the machine can be promptly stopped whenever the expected movement of the measuring apparatus occurs.

A battery, *m*, of sufficient capacity is located in the circuit which traverses the wire in the winding and insulating apparatus, and in a continuation of said circuit through the galvanometer it embraces separate portions of the coil or helix *l* therein, as follows: As indicated in dotted lines on the base of the galvanometer or relay, the battery *m* circuit-branches at post *m'*, one branch proceeding to helix *l*, through one coil thereof to post $m^2$, thence to spool *g*; and the other branch proceeds to and through an oppositely-wound coil therein; thence to and through the resistance-coil *n*, having screw-posts *n'* $n^2$, one on each side thereof; thence to post *o*, to which double connections are made, one being direct to the battery and the other direct to the naked wire *a* on reel *b*. The resistance-coil *n* is the measure or scale employed to gage or measure the insulated wire on spool *g*. If the winding and insulating apparatus be thus connected by way of posts $m^2$ and *o* to the galvanometer, the electric measuring apparatus would be in its normal condition—*i. e.*, one of the coils of the helix *l* being in battery *m* circuit through the insulating apparatus. The outer end of needle *k* is laterally held against back-stop *i*, which, through its pivot and the post itself, together with the metal plate *i'*, on which they are mounted, are electrically connected and in circuit with one pole of the signal-battery.

The front stop *h* is insulated from the plate in a manner well known, and it connects with the other pole of said signal-battery, the circuit thereof being broken when the apparatus is in its normal condition, because one branch of the battery *m* circuit, with comparatively light resistance, passes through the insulating apparatus to one coil of helix, *l*, and is obstructed in the other branch on its way to the second coil by the resistance or measuring-coil *n*, which in each case should contain the resistance which is to be duplicated in the wire wound on spool *g*. As soon as the insulated wire wound on spool *g* offers the same, or substantially the same, resistance in the battery *m* circuit as the resistance *n*, the needle *k* passes from back to front stop, closes the signal-circuit, and sounds an alarm, whereupon the wire is cut, the insulated-wire spool removed and an empty one substituted, a fresh initial end stripped and connected with sleeve *g'*, and thereafter the same operation is repeated as before.

The measuring apparatus, as here shown, is adapted for the use of separate resistance-coils which can be readily applied and removed by making connections of its ends with the proper adjacent screw-posts; but it is to be understood that any suitable complex resistance-box, with the usual graduating arrangement, may be employed in lieu of the separate resistances. When many coils of one capacity are to be produced, and no graduated resistance-box is employed, and no coil is at hand for the particular resistance desired, it will then be necessary to wind and test a sample or pattern coil from which others may be wound, as described, of substantially the same capacity.

While I prefer the opposing or balancing electric currents because of their reliability in aiding me to obtain the most accurate results, I do not limit the main feature of my invention thereto, because it is obvious that results approximating in accuracy may be obtained if an electro-magnet be employed in a circuit traversing the wire in the insulating-machine, in connection with an armature provided with a spring or adjustable weight, the latter having a graduated bar, so as to indicate its capacity for releasing said armature from the magnet whenever the resistance offered in the portion of wire already insulated should reach a certain predetermined number of ohms, and thereby so lessen the power of the magnet in the same circuit that it could not maintain its control of the armature as against the weight or spring.

A device as thus described, would, when employed with the insulating apparatus, constitute an automatic electric measuring device, and the armature thereof could also obviously perform the same service as needle $k$ in operating an electric signal, or it could operate a detent for permitting clock-work to strike a signal. It is only important that the predetermined resistance, however it may be provided for, should be progressively counterbalanced by the resistance offered by that portion of the wire which has been insulated, so that when wire of the desired resistance has been insulated the fact will be promptly indicated by the signal.

As to the galvanometer, it will be obvious, as before herein stated, that its function in my apparatus is merely that of an extremely sensitive relay, and, as before indicated, any sufficiently sensitive relay or pole changer however constructed may be used in lieu thereof; but I prefer such as are operated by opposing currents, or opposing subdivisions of one current, as herein described, because of their superior sensitiveness to electrical influences.

I have shown the one battery $m$ for the circuit, which embraces the wire in the insulating apparatus, and also the measuring apparatus. It is to be understood, however, that I am well aware that separate batteries and separate circuits may be employed with fair results, provided said separate batteries be maintained so as to operate with substantial uniformity—as, for instance, suppose one coil of the helix $l$ of the measuring apparatus be only in circuit with the measuring-coil $n$ and battery $m$, enabling the latter to operate on the needle $k$ with its full force, minus resistance $n$, then suppose the wire in the insulating apparatus to be in a circuit embracing the second coil in helix $l$ with a second battery equal to battery $m$, under the conditions thus stated the second battery would control needle $k$ until the insulated wire on spool $g$ had accumulated so as to equal in its resistance the measuring-coil $n$, whereupon, or soon after, the needle would pass to the front stop and sound the signal. The use of the branch circuit from a single battery, as before described and illustrated, is, however, much preferable to the use of separate batteries, both because of economy and the difficulty in getting two batteries to work with exact uniformity.

Having thus disclosed my invention, numerous other variations and modifications in the several parts of the apparatus described will at once be suggested to persons skilled in the art; and I do not, therefore, limit myself to specific details in construction or to the precise arrangement of the parts which I have illustrated.

I claim as new—

1. The method of electrically measuring insulated wire during the process of insulation, substantially as hereinbefore described, by progressively counterbalancing the resistance of the insulated portion of the wire against a predetermined resistance during the process of insulation, and causing a signal to be made indicating the resistance of the insulated portion when equal to the predetermined resistance.

2. The combination, substantially as hereinbefore described, of wire-insulating apparatus, automatic apparatus for measuring resistance, and a battery-circuit which includes the wire undergoing the process of insulation and controls the measuring apparatus.

3. The combination, substantially as hereinbefore described, of a wire-insulating apparatus, a measuring resistance-coil, a signaling apparatus, and devices for operating the same, and a battery-circuit which controls the signaling apparatus and includes the measuring-coil and the wire in the insulating apparatus.

4. The combination, substantially as hereinbefore described, of the wire insulating and winding or coiling apparatus, the measuring-resistance, a galvanometer operating as a relay, and an electrically-operated signaling apparatus and connections, substantially as described, whereby said signaling apparatus is controlled through said relay by opposing or balancing electric currents respectively traversing the measuring-resistance and the wire undergoing the process of insulation.

GEORGE A. MASON.

Witnesses:
HARMON S. BABCOCK,
F. H. GARDINER.